: 3,101,330
Patented Aug. 20, 1963

3,101,330
PROCESS FOR PREPARING METHYLOL STARCH PROPIONAMIDE
Eugene F. Paschall, Orland Park, and Frederick D. Thayer, Jr., Western Springs, Ill., and William H. Minkema, Fanwood, N.J., assignors to Corn Products Company, New York, N.Y., a corporation of Delaware
No Drawing. Filed May 19, 1959, Ser. No. 814,133
7 Claims. (Cl. 260—233.3)

This invention relates to potentially reactive starch derivatives which form clear water-resistant films, surface coatings and adhesive bonds. More specifically this invention relates to methylol starch propionamide ethers prepared from formaldehyde and starch propionamide and to their use in various applications. Said methylol derivatives when cured alone or in combination with amine- or phenol-formaldehyde monomers or partially condensed polymers form films, surface coatings and adhesive bonds which are water insoluble or resist hydration by water.

It is an object of this invention to provide a new starch derivative. A further object is to provide a new starch derivative which will form, on curing, films or coatings which will resist rehydration in water.

Another object of this invention is to prepare potentially thermosetting methylol derivatives of starch from formaldehyde and starch propionamide ether. Yet another object is to prepare said methylol propionamide derivatives under conditions so that substantially no cross-linking of the starch occurs during the methylolation reaction. A further object is to prepare said methylol starch derivatives by treating starch propionamide in pasted form with formaldehyde at pH of 7–11. A further object is to prepare said methylol starch derivatives by methylolating the starch propionamide in granule form. A still further object is the preparation of films, surface coatings, fiber laminates and moldings from said methylol starch propionamides either alone or in combination with aminoplast and phenolic resin forming materials. A further object is to prepare waterproofing adhesives by forming the methylol starch propionamide in situ by reaction of starch with acrylamide and formaldehyde. Other objects will appear hereinafter.

Our invention is based upon the discovery that starch propionamide, activated with chemically bound methylol groups, may be cured under relatively mild conditions either alone or in combination with various aminoplast or phenoplast resins to form tough, adhesive and cohesive films or coatings which resist rehydration in water.

The methylol starch propionamides are distinguishable in several respects from products which have been prepared by treating starch with formaldehyde. One primary difference is the manner in which formaldehyde is bound to starch. Formaldehyde in the methylol starch propionamide is firmly bound to the amide nitrogen group by a primary chemical bond. The methylol group cannot be removed from the starch propionamide either by washing with water or treating with sodium sulfite. On the other hand, if raw starch is treated with formaldehyde under our conditions for methylolation, all of the formaldehyde can be removed by either of the above treatments.

Adhesives of methylol starch propionamide cure faster and form more insoluble films or coatings under a given set of conditions than films prepared from starch and formaldehyde. Said films are tougher, more pliable and cohesive than films prepared from ordinary starches alone or from mixtures of starch and an aminoplast resin. Water insoluble films can be produced by heat curing of the methylol propionamide products at any pH from about 3 to 13. Since formaldehyde is firmly bound to the starch derivatives herein described, and therefore does not exist as free or easily freed formaldehyde, health hazards due to formaldehyde vapor are minimized. The methylol propionamide derivatives are stable if stored at pH 7–10 at ambient temperatures, whereas starch-formaldehyde mixtures lose formaldehyde on storage.

It is old in the art to prepare waterproofing adhesives from mixtures of starch and various pheno- and aminoplast resins. When such adhesives are cured insolubilization results, primarily from polymerization of the resin component rather than from interaction of the resin with starch. That is, two methylol groups will interact much more readily than will a methylol group and a starch hydroxyl. Some chemical interaction between starch and resin may be effected only by using vigorous curing conditions, i.e., high temperature at an acid pH. These conditions are not practical for many applications. Thus, under the most practical curing conditions, starch in a starch-resin matrix does not undergo sufficient cross-linking to resist at least some rehydration in water. Therefore, it would be desirable to activate starch so that interaction between the activated starch and resin occurs readily under relatively mild curing conditions. Our invention contemplates activating starch with chemically bound polymerizable groups which will combine or polymerize with amino- and phenoplast resins so that starch becomes an integral part of the cured starch-resin matrix.

When used with formaldehyde resins, the resulting adhesives cure faster and form more insoluble films, coatings and fiber laminates than compositions in which starch and formaldehyde replace methylol starch propionamide. Furthermore, we have discovered that methylol starch propionamide is compatible with formaldehyde resins in that tough, clear and nonbrittle films can be prepared from such combination.

The methylol products are particularly useful as the adhesive in paper coating colors where high wet-rub resistance combined with unusually high wax pick is desired. Because methylol starch propionamide derivatives possess both good adhesive nad cohesive qualities, exceptional cohesion of coating color to paper and of coating to clay particles occur. These properties are achieved with methylol starch propionamide alone or in combination with a thermosetting resin, such as melamine- or urea-formaldehyde. It is significant that exceptionally strong adhesion of coating color to paper is obtained with methylol starch propionamide in both the thermally cured and uncured coatings.

Methylol starch propionamides alone or in combination with an aminoplast resin have been found to be effective in imparting a permanent stiffness to fabrics. That is methylol starch propionamide alone or in combination with an aminoplast resin such as trimethylol melamine can be insolubilized on the fabric to the extent that it is not removed after repeated washings. In an example to follow it is shown that there is no decrease in stiffness or loss in weight of size when a cotton fabric sized with methylol starch propionamide is subjected to five successive washings.

One serious problem in the manufacture of acoustical tile using a mixture of mineral wool and starch paste is that the baked product sags in a humid atmosphere. This is due to rehydration of starch at high moisture levels. Since thermally cured films of methylol starch propionamide do not rehydrate to an appreciable extent, the product is potentially useful in this application.

Starch propionamide ethers most suitable for preparing methylol starch propionamide have been described in copending application Serial No. 734,101, filed May 9, 1958, now U.S. Patent No. 2,928,827. There, a process is described for the preparation and purification of starch propionamide ethers at relatively high propionamide D.S. levels which contain substantially no carboxyethyl groups. Starch is reacted under non-gelatinizing and nonswelling conditions with acrylamide in an aqueous medium containing alkali and sodium sulfate, the amount of alkali not exceeding 0.1 mole per mole of starch and the amount of sodium sulfate being at least 0.05 mole per mole of starch. After the reaction is complete the pH of the reaction mixture is adjusted to 2.0 to 4.5 and the starch ether washed with water and recovered. The presence of a large number of carboxyethyl groups is generaly undesirable in uses where high water resistance is needed as they exert a solubilizing effect on the cured film. However, we do not wish to be bound by any particular ratio of propionamide to carboxyethyl groups. Starch propionamide ethers suitable for the invention may be prepared by reacting starch with acrylamide in aqueous alkaline medium at a pH of at least 9.5. The following equations illustrate the preparation of: (1) starch propionamide ether, and (2) methylol starch propionamide.

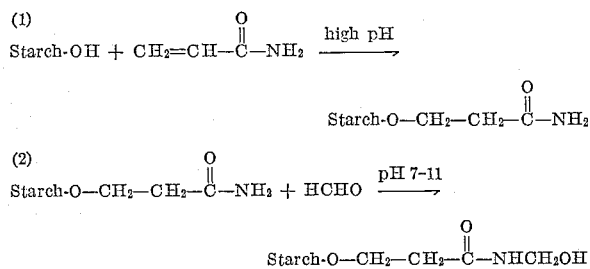

Both the rate of cure and degree of insolubility obtained increase with the number of methylol groups present on the starch propionamide. In general, we find that from about 2 to 50 methylol groups per 100 anhydroglucose units is satisfactory to form a water insoluble film or coating. To obtain the above methylol degree of substitution, it is necessary that the number of propionamide groups range from about 3 to about 75 propionamide groups per 100 glucose units. However, we do not wish to be bound by any limitation with respect to degree of substitution, or method of preparation of the parent starch propionamide.

Our invention is applicable to all starches and starch fractions but is particularly applicable to propionamide ethers prepared from acid- or enzyme-modified corn and waxy starches. Specifically, it is applicable to the propionamides of corn, potato, tapioca, sago, rice, wheat, waxy maize, grain starches in raw or modified form, e.g., modified with acids, enzymes or oxidizing agents. It is also applicable to the propionamide of amylose and amylopectin, the components of corn starch.

The proportion of amide groups which can be methylolated varies with reaction time and temperature as well as pH of the reaction medium. In general, satisfactory results are achieved by methylolating at a temperature ranging from about 40° to 70° C. at a pH of 9 to 11.0 for periods ranging from 1 to 3 hours. These variables are, to some extent, interdependent so that by proper manipulation, methylolation can be effected by operating outside of the above ranges. We prefer, however, to methylolate at about 50° C. at pH 10 for 2 hours.

The efficiency of methylolation increases with concentration of starch propionamide. Therefore, it is generally desirable to methylolate at the highest workable starch concentration. For example, the maximum workable starch concentrations may vary from about 10 percent for thick-boiling starch propionamide to about 40 percent for highly converted thin-boiling starch propionamide.

In general, we find it desirable to use from about 1 to about 1.5 moles formaldehyde per mole of propionamide substituent to perform the methylolation Under these conditions about 50 to 75 percent of the propionamide groups can be methylolated. Where excess formaldehyde is not harmful or where unreacted formaldehyde is removed, more than 1.5 moles of formaldehyde may be employed to achieve reaction efficiencies in the order of 80 percent. Less than 1.0 mole of formaldehyde may be used if desired, particularly where large concentrations of free formaldehyde are undesirable. The following examples describe the nature of our invention with respect to preparation of methylol starch propionamide and to potential uses for the products. These examples are typical and are set forth here only for illustrative purposes.

EXAMPLE 1

The data in Table I show that when the mole ratio of formaldehyde to propionamide groups is increased from 0.25 to 2.5 mole of formaldehyde combined per mole of propionamide group is increased from 0.16 to 0.79. The data also show that raw corn starch does not combine with formaldehyde to form a stable methylol product. The methylol starch propionamide pastes in all experiments were clear, viscous and not cross-linked. Furthermore, the pastes did not setback or undergo bacterial attack upon standing at least 12 months at ambient temperature.

The following experiment is typical:

Reagents: Reagent quantities (mole)
60-fluidity starch propionamide (0.24 D.S.) _____ 0.03
Water _____ 13.8
Sodium hydroxide_____ 0.0027
Formaldehyde _____ 0.062

The starch propionamide ether was pasted by cooking 15 minutes in a round-bottom, three-necked reaction flask provided with agitator, thermometer and reflux condenser. The paste was cooled to 50° C., caustic soda added to raise the paste pH to 10.1, formaldehyde added and the paste stirred at 50° C. for 2 hours. Unreacted or free formaldehyde was quantitatively determined by the Sulfite method (Walker, J. F., "Formaldehyde," page 382, 383, 2nd edition, 1953, Reinhold Publishing Co., New York). The difference between formaldehyde added and free formaldehyde is a measure of formaldehyde bound as methylol groups.

TABLE I.—INFLUENCE OF FORMALDEHYDE CONCENTRATION ON STARCH PROPIONAMIDE REACTION EFFICIENCY

| Expt. No. | Parent starch | Moles HCHO per mole of starch | | |
|---|---|---|---|---|
| | | Used | Uncombined | Combined |
| 17E starch propionamide | 0.24 D.S. | 0.00 | | 0.008 |
| 17D | do | 0.25 | | 0.16 |
| 17C | do | 0.50 | | 0.31 |
| 17B | do | 0.75 | | 0.42 |
| 17A | do | 1.00 | | 0.51 |
| 19B | do | 1.50 | | 0.70 |
| 19C | do | 2.00 | | 0.76 |
| 19D | do | 2.50 | | 0.79 |
| 31A | Raw corn starch | 0.00 | 0.00 | 0.00 |
| 31B | do | 0.24 | 0.25 | 0.00 |
| 31E | do | 0.60 | 0.60 | 0.00 |

EXAMPLE 2

This example illustrates a typical preparation of methylol starch propionamide from starch propionamide. The latter was prepared from pasted corn starch. Both the impure reaction product and the purified product were methylolated.

*Preparation of Starch Propionamide From Pregelatinized Starch*

One mole, 162 grams D.B. of 60-fluidity acid modified corn starch was slurried in 1100 ml. of water and cooked for 15 minutes on a steam bath. The paste was cooled to about 60° C. and 0.06 mole of NaOH added to raise the pH to 12.6. Then, 0.6 mole (43 grams) of acrylamide was added. The paste was stirred 16 hours at 52° C. and the pH reduced to 8.5 by addition of 2 N HCl.

The product was divided into two portions, A and B. Portion A was methylolated without additional purification. Portion B was freeze dried and thoroughly washed with methanol to eliminate impurities before methylolating. The pure product analyzed 0.35 D.S. with respect to propionamide groups based on Kjeldahl nitrogen analysis.

*Methylolation of Unpurified Starch Propionamide*

Five-tenth mole (670 ml.) of aliquot A (above) was heated to 50° C., then 26 ml. of 38 percent aqueous formaldehyde and sufficient NaOH to raise the pH to 10.0 were added. This amount of formaldehyde is equivalent to 1.1 mole per mole of acrylamide used in the propionamide reaction. The paste was stirred in a closed container at 50° C. for 2 hours. The pH dropped to 9.15 during reaction. The product analyzed 0.26 D.S. with respect to methylol groups on starch and on unreacted acrylamide.

*Methylolation of Purified Starch Propionamide*

About 0.14 mole (27.3 grams) of portion B was dispersed in 280 ml. of water. Sufficient aqueous formaldehyde was then added to obtain 1.5 to 1 ratio of formaldehyde to propionamide groups. The pH was adjusted to 10.6 with NaOH and the paste stirred at 50° C. for 3 hours. The final pH was 10.2. The product was 0.24 D.S. with respect to methylol groups.

EXAMPLE 3

Raw corn starch instead of acid modified corn starch was derivatized in the pasted condition to the 0.45 propionamide D.S. level. Starch solids for the propionamide reaction was 10 percent. The products in both crude and pure forms were methylolated with aqueous formaldehyde according to the procedures outlined in Example 2. Approximately 65 percent of the propionamide groups were methylolated for both the crude and pure products.

EXAMPLE 3a

This example illustrates the methylolation of starch propionamide in the semidry form. To 98 grams of 0.18 D.S. granular starch propionamide at 7.5 percent moisture was added 5.55 grams of powdered paraformaldehyde. The mole ratio of formaldehyde to propionamide groups was 1.72. Two grams of powdered anhydrous sodium carbonate was then added and the mixture blended thoroughly in a Waring Blendor. After blending, the mixture analyzed 4.88 percent formaldehyde by the Sulfite Method. A 25 gram portion of the mixture was introduced to a Sprengel pressure flask and sealed. The flask and contents were placed in a 50° C. constant temperature bath for 16 hours. The flask was then cooled to 25° C. and the mixture analyzed for free formaldehyde. An average value of 3.53 percent formaldehyde was found showing that 1.35 percent of the original formaldehyde was bound as methylol starch propionamide. This amount is equivalent to 0.48 mole formaldehyde bound per mole of propionamide.

EXAMPLE 4

This example compares the effect of acidic and alkaline pH catalysts for curing cast films of methylol starch propionamide. A 0.24 D.S., 60–F starch propionamide paste at 10 percent starch solids was methylolated with various quantities of formaldehyde. The pH of the methylolated paste was adjusted with alum, HCl or NaOH to the desired value and films cast on stainless steel plates. The films were cured one hour at 80° C., ground and extracted with water at 60° C. The weight of the insoluble residue was then determined.

In Experiment 43 unreacted formaldehyde was removed from the methylolated product by first dialyzing in water, freeze-drying, and then washing the freeze-dried product with methanol. The unusually high percent insolubles shows that free formaldehyde increases the solubility of the cured film. This indicates that for maximum insolubility, the absence of free formaldehyde is necessary. This can be accomplished by washing the product with water as described above, by chemical methods whereby a formaldehyde reactive substance such as sodium sulfite is added, or by using low amounts of formaldehyde for methylolation.

TABLE II.—INSOLUBLES OF METHYLOL STARCH PROPIONAMIDE FILMS CURED AT 80° C. FOR ONE HOUR

| Experiment number | Moles HCHO per mole propionamide | | Catalyst | Paste pH | Insolubles, percent dry basis extracted at 60° C. |
| --- | --- | --- | --- | --- | --- |
| | Used | Combined | | | |
| 31A | 1.0 | 0.56 | Alum | 4.5 | 92.5 |
| 32 | 1.5 | 0.61 | ---do--- | 4.5 | 90.1 |
| 43 | 1.5 | 0.68 | ---do--- | 4.5 | ¹ 98.3 |
| 7C | 0.5 | 0.31 | ---do--- | 4.5 | 81.3 |
| 61C | 1.0 | 0.56 | HCl | 4.5 | 79.8 |
| 61D | 1.0 | 0.56 | NaOH | 12.6 | 77.8 |

¹ Excess HCHO removed by dialysis.

EXAMPLE 5

This example illustrates the use of methylol starch propionamide alone and in combination with a commercial thermosetting resin to impart a permanent finish to cotton fabrics. The methylol starch propionamide employed was prepared from a 0.24 D.S., 60-fluidity starch propionamide. The derivative was methylolated with 1.5 moles formaldehyde per mole of propionamide group. The product was 0.17 D.S. with respect to methylol groups. The following procedures were used for sizing and measuring the permanency of the size on cotton cloth:

PADDING SOLUTION 1 percent methylol starch propionamide (based on wt. of bath)
10 percent Zeset S resin which is a melamine-urea-formaldehyde resin (based on wt. of bath)
0.25 percent tartaric acid (based on wt. of resin)
(Resin and catalyst not used where starch is used alone.)

NEUTRALIZATION BATH 0.1 percent soda ash (based on wt. of bath)
0.05 percent Duponol D Paste which is a surface active agent comprising a mixture of fatty alcohol sulfates (based on wt. of bath)

FINISHING PROCEDURE

Cotton cloth 80 inch x 80 inch was sized with the padding solution, and excess liquid removed with squeeze rolls. The swatch was dried on a mangle iron at about 200° F., then cured one minute at 325°–350° F. The fabric was first rinsed in the neutralization bath, then rinsed in clear water and finally dried on a mangle iron.

WASHING CYCLE

To determine the permanency of the finish, the fabric was washed, rinsed and damp dried in an automatic washing machine. It was then ironed dry on the mangle iron as before.

The stiffness of the fabric was determined from flexural rigidity using a Drape-O-Flex stiffness tester.

The results below show that methylol starch propionamide alone produces greater stiffness after 5 washings (74 mg.-cm.) than a conventional starch plus resin and catalyst (66 mg.-cm.). When methylol starch propionamide is used with resin and catalyst, the stiffness is not only exceptionally high after 5 washings (86 mg.-cm.) but is also greater than initially (80 mg.-cm.) observed.

| Thermosetting resin | Percent pick-up initial | Percent size retained after 5th wash | Flexural rigidity (mg.-cm.) | |
|---|---|---|---|---|
| | | | After neutralization | After 5th wash |
| Methylol starch propionamide without resin or catalyst | 0.52 | 0.79 | 74 | 74 |
| Methylol starch propionamide with resin and catalyst | 5.1 | 4.8 | 80 | 86 |
| 8-F white milo starch with resin and catalyst | 5.7 | 1.7 | 82 | 66 |

EXAMPLE 6

This example illustrates a typical preparation of methylol starch propionamide in granule form from starch propionamide. The latter was prepared in granule form from unmodified corn starch following procedures described in copending application Serial No. 734,101, filed May 9, 1958, now U.S. Patent No. 2,928,827.

*Preparation of Granule Methylol Starch Propionamide from Granule Starch Propionamide*

One mole, 163.4 grams d.b. of granule starch propionamide, 0.02 D.S., was slurried in 534 grams of water in which had been dissolved 44.5 grams of anhydrous sodium sulfate. To this mixture there was added 2.25 milliliters formalin and 7.0 milliliters of N sodium hydroxide. This reaction mixture, approximately pH 10.0, contained in a three-necked flask provided with agitator, thermometer and reflux condenser was placed in a 50° C. constant temperature bath. The reaction mixture was sampled and analyzed for formaldehyde prior to placing in the bath. Analysis showed 0.111 percent of formaldehyde to be present. After agitating the reaction mixture at 50° C. for 2 hours, the free formaldehyde content had dropped to 0.0957 percent. These results show that 0.207 mole of formaldehyde had combined per mole of propionamide. After 24 hours, 0.425 mole of formaldehyde had combined.

EXAMPLE 7

This example illustrates the preparation of methylol starch propionamide in granule form and the use of the methylol product as a waterproof adhesive for paper. Two-tenth mole of acrylamide and 0.14 mole $Na_2SO_4$ were added to one mole of raw corn starch (180 grams at 12 percent $H_2O$) in 200 ml. of water. Then, 0.08 mole of NaOH in 60 ml. of water was added while agitating vigorously. The slurry was stirred 16 hours at 40° C.

The pH of the slurry was then reduced to pH 10.0 with HCl and 17 ml. of a 37 percent aqueous solution of formaldehyde added. The slurry was stirred one hour at 45° C. The methylol product was filtered and washed with water. A cooked paste of the product was relatively clear and fluid indicating that substantially no cross-linking of the starch granules by formaldehyde occurred during methylolation.

A 30 percent paste of the methylol starch propionamide was cooked in water and then applied in a thin film to a strip of kraft paper. A second strip of kraft paper was glued on the sized strip with a hand iron set at 320° F. The bonded paper did not separate when boiled in water for 10 minutes. Strips of kraft paper similarly bonded with the parent starch propionamide separated within 30 seconds in the boiling water.

EXAMPLE 8

This example illustrates the use of methylol starch propionamide in clay coating colors to improve wet-rub resistance and Dennison wax pick. The methylol derivative was prepared from pasted 60–F, 0.24 D.S. starch propionamide. Methylol D.S. was 0.16.

A clay slip was prepared by dispersing Paper Clay KCS in water containing 0.3 percent of sodium pyrophosphate so as to obtain 72 percent clay solids. The pasted methylol starch propionamide was added to the clay slip in an amount to give 20 percent adhesive based on clay. A solution of wool soap, 2 percent soap based on methylol starch propionamide solids, was added next and the coating color adjusted to 40 percent solids with water.

The coating was applied to coating rawstock of 50 pounds basis weight (24 x 36/500 ream) with the following results.

Dennison wax pick air-dried cure (24 hr.) _____ 11—
   300 ° F., 1 minute _____ 11
Wet-rub resistance:
   300 ° F., 1 minute _____ Excellent
   300 °F., ½ minute _____ Good
   200 ° F., 2 minutes _____ Slight Papers coated with methylol starch propionamide possess Dennison wax pick values at least 2 points higher than is encountered with conventional thin-boiling starches. Also, sufficient cross-linking of methylol starch propionamide occurs at 300° F. in the absence of a catalyst to give good to excellent wet-rub resistance.

EXAMPLE 9

This example compares the properties of clay coating colors for paper prepared using as the adhesive a standard acid modified corn starch, methylol starch propionamide, or the latter in combination with a melamide-formaldehyde resin and using ammonium chloride as the curing catalyst. Paper Clay KCS stabilized with 0.3 percent tetrasodium pyrophosphate was employed in preparing the pigment slip.

| Adhesive | | $NH_4Cl$ (g.) | pH | Viscosity cps.[1] | Dried 3 min. at 240° F. | |
|---|---|---|---|---|---|---|
| Type | Grams/100 grams clay | | | | Wax pick | Wet rub |
| (9E) MSP | 18 | 6 | 5.2 | 23,550 | 6 | Excellent. |
| MF resin | 2 | | | | | |
| (4F) MSP | 20 | 8 | 5.1 | 40,600 | 7 | Good. |
| 87C 40-fluidity oxidized corn starch. | 20 | 8 | 6.4 | | 5 | Poor. |

[1] Brookfield viscometer Model LVF No. 4 spindle at 12 r.p.m.
NOTE.—MSP, methylol starch propionamide; MF resin, methylated trimethylolmelamine resin (Lanaset Resin).

The results show that acceptable Dennison wax picks are obtained when using an acid curing catalyst with either methylol starch propionamide or the latter in combination with a melamine resin. Wet-rub resistance is improved when the melamine resin replaces about 10 percent of methylol starch propionamide.

The waterproofing potential of starch based corrugating adhesives can be increased with methylol starch propionamide. The greatest improvement is achieved when methylol starch propionamide is used as the carrier portion of the adhesive. The carrier is the gelatinized starch portion of a corrugating adhesive. One of its functions is to hold ungelatinized starch in suspension so that the adhesive can be easily transferred in the corrugator. Either preformed methylol starch propionamide or methylol starch propionamide prepared by in situ reaction may be employed. When the latter is used, formaldehyde must be added to the slurry consisting of carrier and raw starch and agitated for about ½ hour before use to form the desired methylol starch propionamide. Actually, since the carrier starch is normally cooked in alkali, the starch propionamide can also be prepared in situ by addition of acrylamide to the carrier prior to cooking.

Best results are achieved when methylol starch propionamide is used with a synthetic thermosetting resin such as urea-HCHO, ketone-HCHO or resorcinol-HCHO resin. The improvement probably results from a greater interaction of methylol starch propionamide with the resin component than occurs when the latter is replaced with unmodified starch.

EXAMPLE 10

This experiment illustrates the use of methylol starch propionamide and resorcinol-HCHO in an alkaline setting waterproofing corrugating adhesive. In this example both starch propionamide and resorcinol were methylolated by in situ reaction.

A slurry containing 10 grams of 0.4 D.S. thick-boiling starch propionamide and 0.75 gram of NaOH in 70 ml. of water was heated to 70° C. and stirred at this temperature for 5 minutes. To the gelatinized starch propionamide paste, 0.5 gram of resorcinol was added. The paste was stirred an additional 10 minutes at 70° C.

After cooling to about 40° C., the carrier paste was added to a slurry of 50 grams of raw corn starch in 135 ml. of water. Three grams of paraformaldehyde was added and the formulation stirred 1 hour to effect methylolation of starch propionamide and resorcinol. Two strips of kraft paper were glued together with the adhesive by heating the sized strips 3 seconds under a 2000-gram weight. After soaking the strips in cold water for 24 hours, considerable fiber pull was noted when the strips were separated.

This formulation gave better waterproofing than an adhesive similarly prepared using corn starch as the carrier instead of starch propionamide.

EXAMPLE 11

This example illustrates the preparation of an alkaline setting waterproofing corrugating adhesive in which both the propionamidation and methylolation reactions were performed by in situ reaction.

A slurry was prepared consisting of 10 grams of raw corn starch, 5 grams of acrylamide in 50 ml. of water. One gram of NaOH dissolved in 10 ml. of water was then added and the paste heated 15 minutes at 68° C. The paste was cooled to about 40° C. and then added to a slurry consisting of 50 grams of raw starch in 140 ml. of water. Then, 11 ml. of a commercial urea-formaldehyde resin (UF Concentrate 85) containing excess formaldehyde was added and the formulation stirred 1 hour.

Considerable water resistance was imparted when the adhesive was tested in the manner described in Example 10. A formulation similarly prepared without acrylamide gave poor waterproofing results.

EXAMPLE 12

This example illustrates the preparation of a waterproof corrugating adhesive using preformed methylol starch propionamide and a commercial urea-formaldehyde resin, sold under Urac 110.

Ten grams of thick-boiling methylol starch propionamide, 0.5 D.S. with respect to propionamide, was added to 60 ml. of water containing 0.5 gram of NaOH. After heating 15 minutes at 68° C. the paste was cooled to about 40° C.

The cooled paste was slowly added to a slurry consisting of 50 grams of raw corn starch, 5 grams of Urac 110 resin in 140 ml. of water. After thorough mixing, 2 grams of paraformaldehyde was added and the formulation stirred 45 minutes.

When tested by the procedure previously described, this formulation imparted more water-resistance to paper than a formulation similarly prepared in which unmodified raw starch replaced methylol starch propionamide.

We claim:
1. A process for preparing methylol starch propionamide, in which the methylol group is attached to the amide nitrogen, and which contains some free hydroxyl groups per anhydroglucose residue of starch, which comprises reacting starch and acrylamide in an aqueous alkaline medium and treating the resultant product with formaldehyde in an aqueous alkaline medium at a pH of 7 to 11.

2. Process according to claim 1 wherein the pH during methylolation is within the range of 9 to 11.

3. A process for preparing methylol starch propionamide, in which the methylol group is attached to the amide nitrogen, and which contains some free hydroxyl groups per anhydroglucose residue of starch, which comprises reacting starch propionamide and formaldehyde in an aqueous alkaline medium at a pH of 7 to 11.

4. Process according to claim 3 wherein the pH during the reaction is within the range of 9 to 11.

5. A process for preparing methylol starch propionamide, in which the methylol group is attached to the amide nitrogen, and which contains some free hydroxyl groups per anhydroglucose residue of starch, which comprises reacting semi-dry starch propionamide and formaldehyde.

6. As a composition of matter methylol starch propionamide, in which the methylol group is attached to the amide nitrogen, said composition containing some free hydroxyl groups per anhydroglucose residue of starch, and said composition being water-soluble and non-crosslinked.

7. A cross-linked, water-insoluble starch film which has been prepared by casting a paste of methylol starch propionamide to the desired thickness; said methylol starch propionamide having the methylol group attached to the amide nitrogen, and containing some free hydroxyl groups per anhydroglucose residue of starch; and drying the cast paste at a pH within the range of 3 to 13, at a temperature sufficient to insolubilize the film.

References Cited in the file of this patent

UNITED STATES PATENTS

| | | |
|---|---|---|
| 2,173,005 | Strain | Sept. 12, 1939 |
| 2,618,633 | Vaughan | Nov. 18, 1952 |
| 2,813,840 | Salzberg | Nov. 19, 1957 |
| 2,837,511 | Mantell | June 3, 1958 |
| 2,837,512 | Mantell | June 3, 1958 |
| 2,859,206 | Polansky | Nov. 4, 1958 |
| 2,876,217 | Paschall | Mar. 3, 1959 |
| 2,886,541 | Langlois et al. | May 12, 1959 |
| 2,928,827 | Paschall | Mar. 15, 1960 |
| 2,938,026 | Stephens et al. | May 24, 1960 |
| 2,973,243 | Kudera | Feb. 28, 1961 |